United States Patent [19]

Koch

[11] Patent Number: 5,055,858

[45] Date of Patent: Oct. 8, 1991

[54] THERMAL PRINTING HEAD

[75] Inventor: Ulf Koch, Eberbach, Fed. Rep. of Germany

[73] Assignee: Esselte Meto International Produktions GmbH, Hirschhorn, Fed. Rep. of Germany

[21] Appl. No.: 495,971

[22] Filed: Mar. 20, 1990

[30] Foreign Application Priority Data

Mar. 21, 1989 [DE] Fed. Rep. of Germany ....... 3909286

[51] Int. Cl.[5] ........................ G01D 15/10; B41J 2/335

[52] U.S. Cl. ................................................ 346/76 PH

[58] Field of Search .................... 346/76 PH; 400/120

[56] References Cited

U.S. PATENT DOCUMENTS 4,342,040 7/1982 Fujita et al. .................... 346/76 PH
4,757,329 7/1988 Sato et al. ...................... 346/76 PH

FOREIGN PATENT DOCUMENTS 0134274 6/1988 Japan .................................. 400/120

*Primary Examiner*—Benjamin R. Fuller
*Assistant Examiner*—Huan Tran
*Attorney, Agent, or Firm*—Sixbey, Friedman, Leedom & Ferguson

[57] ABSTRACT

A thermal printing head (10) is described which comprises a supporting frame (12, 14, 16, 18, 20, 22) and a thermal printing plate (28). Several individually triggerable heating elements are provided along a line on the front side of the thermal printing plate (28). The thermal printing plte (28) is held in frictional contact with a counter-pressure roll (26) rotatably mounted in the supporting frame. The line of heating elements contacts the counter-pressure roll along a paraxial generating line. At least one locking hook (38, 40) being in engagement with a pin fixed on the supporting frame is provided on the thermal printing plate (28) to be spaced apart from the line of heating elements. At least one pressure spring (54, 56) is provided in the region situated between the at least one locking hook (38, 40) and the line of heating elements between a stop (62, 64) being in fixed connection with the supporting frame and the rear side of the thermal printing plate (28). The at least one pressure spring (54, 56) is secured on the thermal printing plate (28) by means of a retaining means (50, 52, 48).

3 Claims, 2 Drawing Sheets

THERMAL PRINTING HEAD

Figure 1:
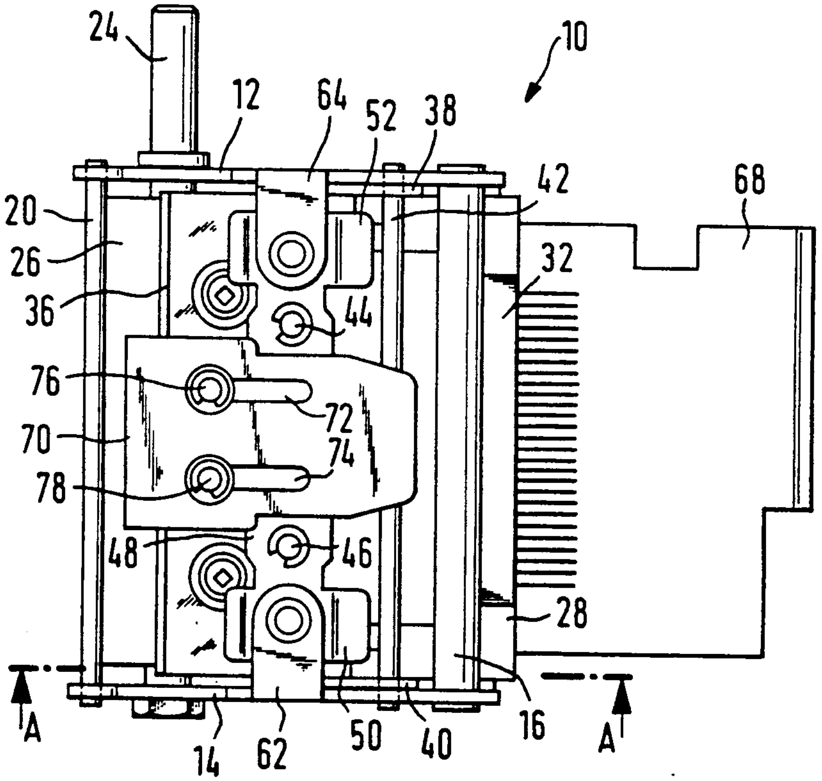

The invention relates to a thermal printing head having a supporting frame, a thermal printing plate comprising, on one front side, several heating elements being arranged along a line and being triggerable individually, and a counter-pressure roll being rotatably mounted in the supporting frame and having the thermal printing plate held therewith in frictional contact so that the line of heating elements contacts the circumferential surface of the counter-pressure roll along a paraxial generating line.

Such a thermal printing head is known from EP-A-0 191 493. In this known thermal printing head, a thermal printing plate is mounted in a supporting frame to be rotatable about an axis. A spring holds the thermal printing plate in contact to a counter-pressure roll, the thermal printing plate being oriented with respect to this counter-pressure roll so that the line of heating elements is identical to the line on which the thermal printing plate contacts the counter-pressure roll. In the known printing head, the spring is situated precisely in the plane extending through the counter-pressure roll axis and the contact line between the thermal printing plate and the generating line of the counter-pressure roll. Due to this special arrangement of the spring, the latter generates a pure torque about the mounting axis of the thermal printing plate; no transverse forces acting on the mounting axis are generated. The thermal printing plate comprises a closed eye as a mounting element through which the mounting axis extends. Since the person skilled in the art knows about the mode of operation of such a thermal printing head, it may suffice here to refer to the fact that the heat-sensitive paper is printed by moving it through between the counter-pressure roll and the thermal printing plate pre-stressed in the direction of the thermal printing roll while the heating elements of the thermal printing plate are heated selectively by current supply in dependence upon the data to be printed respectively, the data supply being synchronized with the paper feeding rate.

Due to the fact that the thermal printing plate is fixed in the housing of the printing head by means of a closed eye and a mounting axis, the thermal printing plate may certainly be pivoted about the mounting axis, but may not be taken out of the printing head without the mounting axis being pulled out. However, it is not every user who can be expected to dismount the mounting axis, but it is normally left to the maintenance personnel to carry out such manipulations. Therefore the user cannot easily clean a dirty thermal printing head or remove paper therefrom which may have got stuck.

It is the object underlying the invention to create a thermal printing head of the kind described which facilitates easy removal or the thermal printing plate due to its structure.

This object is met in accordance with the invention in that at least one locking hook engaging a pin fixed to the supporting frame is provided on a location being spaced apart from the line of heating elements, that, in the region between the at least one locking hook and the line of heating elements, there is provided at least one pressure spring between a stop in fixed connection with the supporting frame and the rear side of the thermal printing plate facing away from the front side of the thermal printing plate, and that the at least one pressure spring has allocated therewith a retaining means for securing the pressure spring at the thermal printing plate.

In the thermal printing head according to the invention, the thermal printing plate is secured in the supporting frame by means of at least one locking hook, which facilitates pulling the thermal printing plate out from the supporting frame just by exerting a tensile force on the thermal printing plate and consequently on the locking hook connected therewith. The locking hook slides over the pin under the influence of the tensile force to that the thermal printing plate is no longer fixed on the supporting frame. Safe securing in the supporting frame is obtained not only by suitably configuring the locking hook, but also by the spring causing the frictional contact of the thermal printing plate on the counter-pressure roll, in addition to the torque about the pin embraced by the locking hook, also generating a transverse force pressing the locking hook against the pin so that easy detachment of the locking hook from the pin is counteracted. The retaining means allocated to the spring ensures that the spring does not get lost when the thermal printing plate is pulled out from the supporting frame, but is secured on the thermal printing plate.

Moreover, the thermal printing according to the invention comprises a simple structure and thus may be manufactured inexpensively. Its operational dependability and easy maintenance are also increased thereby.

Advantageous further developments of the invention are specified in the subclaims.

The invention will be explained by way of example using the following drawing. Therein FIG. 1 is a plan view on the thermal printing head in accordance with the invention, FIG. 2 a section along line A—A of FIG. 1, FIG. 3 a view of the thermal printing plate without supporting frame if seen from the right in FIG. 1, FIG. 4 a simplified representation for explaining the principle underlying the invention.

Figure 2:
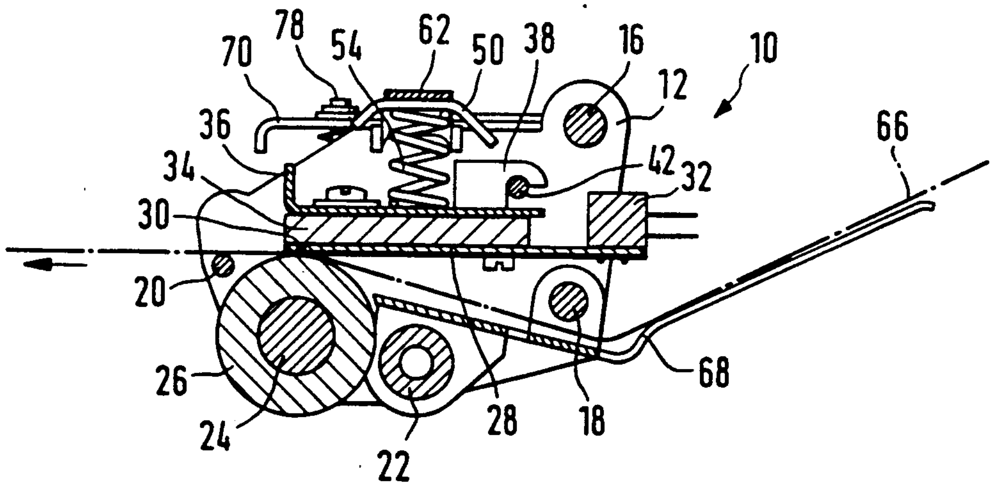

Thermal printing head 10 as depicted in plan view in FIG. 1 and depicted in sectional view in FIG. 2 has a supporting frame comprising two side plates 12 and 14. Side plates 12 and 14 are connected to each other by several axes 16, 18, 20, 22. Moreover, one axis 24 carrying a counter-pressure roll 26 is rotatably mounted in the two side plates. A thermal printing plate 28 carrying a plurality of heating elements along a line 30 on a ceramic substrate, in the vicinity of its end being situated to the left in FIG. 2, is provided in the supporting frame between side plates 12 and 14. Non-represented integrated circuits are also provided on the ceramic substrate serving for triggering the heating elements. Printed connection lines lead from the printed circuits to the heating elements on the one hand and to connection plug 32, which may be seen in FIG. 1 on the right end of thermal printing plate 28, for connection to a non-represented socket. A cooling body 34 contained in thermal plate 28 serves for dissipating excess heat. A metal sheet 36 respectively provided with one locking hook 38, 40 in the region of side plates 12, 14 is fixed on cooling body 34. FIG. 2 shows that locking hook 38 engages axis 42 from above, said axis extending between side plates 12 and 14. Locking hook 40 similarly grips this axis 42.

Figure 3:
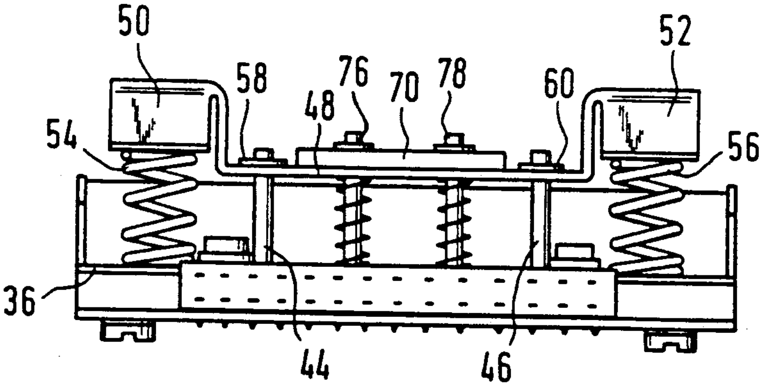

Two pins 44, 46 to be seen in FIG. 3 protrude upwardly from metal sheet 36, a retaining means being slidably attached on said pins and comprising two plates 50, 52 being connected by web 48. Pressure springs 54, 56 are situated between plates 50 and 52, respectively, and metal sheet 36.

FIG. 3 shows that springs 54 and 56 push the retaining means together with web 48 and plates 50, 52 away from metal sheet 36 so far as allowed for by two securing rings 58 or 60, respectively, provided on pins 44, 46.

Stops 62 or 64 are provided on side plates 12 and 14, respectively, said stops reaching over plates 50, 52 according to FIG. 1 and engaging the upper surfaces of these plates. The distance between metal sheet 36 and stops 62, 64 is dimensioned so as to be smaller than the way which may be covered by the retaining means together with web 48 and plates 50, 52 until web 48 rests in contact on securing rings 58, 60. This means that, in the arrangement of the individual components according to FIG. 2, pressure springs 54, 56 are compressed owing to the cooperation of stops 62, 64 and plates 50 or 52, respectively to exert a pressure force putting downward load on thermal printing plate 28 in the representation of FIG. 2. Thermal printing plate 28 is accordingly held, by the spring, in contact with counter-pressure roll 26 along line 30 of the heating elements. Due to the arrangement of pressure springs 54, 56 in the region between axis 42 and the contact line between thermal printing plate 28 and counter-pressure roll 26, pressure springs 54, 56 not only generate the force for holding the thermal printing plate in contact with counter-pressure roll 26, but they also generate a locking force between locking hooks 38, 40 and axis 42 to prevent easy detachment of thermal printing plate 28 from axis 42. It is important that this transverse force on axis 42 be generated since a tensile force being directed to the left in FIG. 2 is exerted on thermal printing plate 28 in operation of the thermal printing head, which might entail detachment of locking hooks 38, 40 from this axis 42.

The mentioned tensile force is generated as follows: dot-dash line 66 to be seen in FIG. 2 indicates the path of the heat-sensitive paper to be printed through thermal printing head 10. Counter-pressure roll 26 is rotated counterclockwise by means of a driving device (not represented) acting on axis 24 during execution of a printing process. The paper is transported, by frictional driving, past line 30 of the heating elements of thermal printing plate 28 through forward movement in the direction of the arrow indicated in FIG. 2 so that the desired data may be generated due to selective heating of the paper and the resulting blackening via corresponding electric triggering of the individual heating elements. A frictional force is equally exerted on thermal printing plate 28 in this paper transport movement to result in the mentioned tensile force directed to the left. Detachment of locking hooks 38, 40 from axis 42 is prevented by the mentioned transverse force being generated by pressure springs 54, 56.

It may be seen that locking hooks 38, 40 do not absolutely have to cooperate with an axis extending between the two side plates 12 and 14; it is also easily possible to provide an inwardly protruding pin on each side plate which might be gripped by locking hooks 38, 40 as is represented in FIG. 2. However, the fact that axis 42 juts out contributes to further rigidity and accordingly to increased stability of the supporting frame.

A guiding sheet 68 fixed on side plates 12 and 14 serves for properly feeding the recording carrier.

Figure 4:
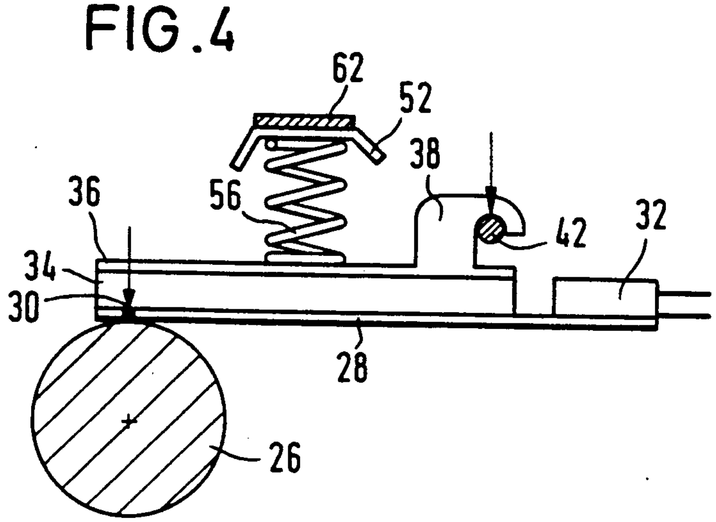

The schematic representation of FIG. 4 shows the principle of the arrangement of thermal printing plate 28 relative to counter-pressure roll 26 and axis 42. Arrows indicate the pressure forces generated by pressure springs 54, 56.

The fact that locking hooks 38, 40 are formed to be open and that a retaining means is provided for pressure springs 54, 56 makes it possible to easily pull thermal printing plate 28 out from the supporting frame. Thermal printing plate 28 is provided with a handle member 70 to be pushed out which comprises two elongate holes 72, 74 so that it may be shifted to the left in the representation of FIG. 1 and 2. This facilitated grasping handle member 70 when thermal printing plate 28 is to be pulled out from the supporting frame. When a tensile force is exerted onto handle member 70, the latter is first shifted to the left until elongate holes 72, 70 stop carrier pins 76, 78, and a tensile force is subsequently exerted on thermal printing plate 28 which is large enough for surmounting the transverse force exerted by pressure springs 54, 56 on axis 42 via locking hooks 38, 40. Consequently locking hooks 38, 40 slide over axis 42 with springs 54, 56 being compressed further so that thermal printing plate 28 may be pulled out from the supporting frame to the left. Pressure springs 54, 56 are secured by retaining means 48, 50, 52 so that they cannot get lost. The thermal printing plate being pulled out may be easily cleaned, and the counter-pressure roll may be cleaned as well, if need be If the paper should have got jammed in the supporting frame, it may easily be grasped with the thermal printing plate being pulled out and brought into the right position again.

Since plates 50, 52 of the retaining means and pressure springs 54, 56 are provided with ends angularly bent with respect to the direction of removal of thermal printing plate 28, which may be gathered from FIG. 2, thermal printing plate 28 may easily be re-inserted in the supporting frame as these angularly bent ends act like bevelled insertion portions.

Due to the fact that the thermal printing plate may be removed, the thermal printing head described is easy in handling and maintenance; the region where the actual printing process takes place and where dirt results from rubbed-off particles in particular may easily be cleaned.

I claim:

1. A thermal printing head having a supporting frame, a thermal printing plate comprising on a front side several individually triggerable heating elements being arranged along a line, and a counter-pressure roll rotatably mounted in said supporting frame, the thermal printing plate being held in frictional contact with said roll so that the line of heating elements contacts a circumferential surface of the counter-pressure roll along a paraxial generating line, wherein at least one locking hook is in engagement with a pin fixed on the supporting frame said at least one locking hook is provided on the thermal printing plate, on a location being situated to be spaced apart from the line of heating elements, and wherein at least one pressure spring is provided in the region between the at least one locking hook and the line of heating elements between a stop in fixed connection with said supporting frame, and the rear side of the thermal printing plate facing away from the front side of the thermal printing plate, and that the at least one pressure spring has allocated therewith a retaining means for securing a pressure spring on the thermal printing plate, wherein the retaining means is formed by a plate being shiftable by a predetermined distance on at least one pin extending perpendicularly with respect to the rear side of the thermal printing plate and embracing an end of the pressure spring facing away from the rear side of thermal printing plate, that the stop is held in engagement with the plate forming the retaining means and that the predetermined distance is larger than the distance of the stop from the rear side of the thermal printing plate and where two pressure springs are provided to be symmetrical with respect to a line bisecting the line of the heating elements and extending perpendicularly with respect to this line and that the retaining means comprises a plate for each of the pressure springs, the two plates being connected to each other by a web, locking hook release means for releasing said at least one locking hook from said pin, said locking hook release means including means for exerting a force in opposition to the pressure springs in response to a force applied to said locking hook release means such that said at least one locking hook passes over the pin and said thermal printing plate is thereby released from said supporting frame.

2. A thermal printing head according to claim 1, characterized in that two locking hooks (38, 40) are provided on the thermal printing plate (28) and that the pin the locking hooks (38, 40) are in engagement with, is formed by an axis (42) extending between the two side plates of the supporting frame parallel with respect to the counter-pressure roll (26).

3. The thermal printing head of claim 1, wherein the locking hook release means comprises a handle member and an elongated slot associated with said handle member, said locking hook release means further including a carrier pin associated with the thermal printing plate and extending into said elongated slot, wherein said handle member is movable in a first direction causing relative movement between the slot and carrier pin until said carrier pin engages an end portion of said slot whereupon continued movement of said handle member causes compression of said pressure springs such that said at least one locking hook passes over the pin fixed on the supporting frame.

* * * * *